US009995572B2

(12) United States Patent
Ni (10) Patent No.: US 9,995,572 B2
(45) Date of Patent: Jun. 12, 2018

(54) ELEVATION ANGLE ESTIMATING DEVICE AND METHOD FOR USER TERMINAL PLACEMENT

(71) Applicant: WorldVu Satellites Limited, St Helier, Jersey (CH)

(72) Inventor: Melvin S. Ni, Cupertino, CA (US)

(73) Assignee: World Vu Satellites Limited, Arlington, VA (US)

( * ) Notice: Subject to any disclaimer, the term of this patent is extended or adjusted under 35 U.S.C. 154(b) by 537 days.

(21) Appl. No.: 14/674,363

(22) Filed: Mar. 31, 2015

(65) Prior Publication Data

US 2016/0290793 A1   Oct. 6, 2016

(51) Int. Cl.

| G01B 11/26 | (2006.01) |
|---|---|
| G01C 1/00 | (2006.01) |
| G02B 27/32 | (2006.01) |
| G02B 17/08 | (2006.01) |

(52) U.S. Cl.
CPC ............... *G01B 11/26* (2013.01); *G01C 1/00* (2013.01); *G02B 27/32* (2013.01); *G02B 17/08* (2013.01)

(58) Field of Classification Search
CPC .... H04B 7/18519; H04B 7/185; H04B 17/00; H04B 7/20
See application file for complete search history.

(56) References Cited

U.S. PATENT DOCUMENTS

| 2,410,667 A | 11/1946 | Luboshez |
| 2,949,808 A | 8/1960 | Thurow |
| 5,159,401 A | 10/1992 | Decker, Jr. |
| 5,541,726 A | 7/1996 | Nakajima |
| 5,757,315 A | 5/1998 | Aoki |
| 6,169,881 B1 * | 1/2001 | Astrom ............. H04B 7/18519 455/12.1 |
| 6,313,865 B1 | 11/2001 | Driscoll, Jr. et al. |

(Continued)

FOREIGN PATENT DOCUMENTS

| WO | 9109325 A1 | 6/1991 |
| WO | 9957824 A2 | 11/1999 |

(Continued)

OTHER PUBLICATIONS

Officer: Lee W. Young, "International Search Report" dated Jun. 30, 2016 in counterpart International PCT Application No. PCT/US16/25012.

(Continued)

*Primary Examiner* — Luke D Ratcliffe
(74) *Attorney, Agent, or Firm* — Kaplan Breyer Schwarz, LLP (57) ABSTRACT

A device and method for estimating the elevation angle of one or more objects surrounding a user terminal include a convex image-reflecting surface, a transparent sighting surface disposed above the convex image-reflecting surface, and an elevation limit marking formed on or in the sighting surface. The elevation limit marking generates a reflected image in the convex image-reflecting surface that defines an elevation angle above a horizon of the earth that the one or more objects in a field of view of the convex image-reflecting surface must remain below so that the user terminal has an unobstructed view of the sky in all azimuthal directions.

20 Claims, 9 Drawing Sheets

(56) References Cited

U.S. PATENT DOCUMENTS

| | | | |
|---|---|---|---|
| 7,541,975 B2* | 6/2009 | Sever | G01S 19/28 |
| | | | 342/357.48 |
| 2006/0244749 A1 | 11/2006 | Kondo et al. | |
| 2008/0166011 A1 | 7/2008 | Sever et al. | |
| 2009/0055776 A1 | 2/2009 | Audet | |
| 2012/0121125 A1 | 5/2012 | Dimov | |
| 2012/0249745 A1 | 10/2012 | Gagel et al. | |
| 2012/0293678 A1 | 11/2012 | Amor Molares et al. | |
| 2013/0314699 A1* | 11/2013 | Jungerman | G01J 1/0266 |
| | | | 356/139.01 |
| 2014/0161358 A1 | 6/2014 | O'Haire et al. | |
| 2014/0340427 A1 | 11/2014 | Baker | |
| 2016/0363443 A1 | 12/2016 | Ni | |

FOREIGN PATENT DOCUMENTS

| | | |
|---|---|---|
| WO | 0074271 A1 | 12/2000 |
| WO | 2006113689 A2 | 10/2006 |
| WO | 2016199110 A1 | 12/2016 |

OTHER PUBLICATIONS

Authorized Officer: Blaine R. Copenheaver, "International Search Report" dated Jul. 12, 2016 in related International PCT Application No. PCT/US2016/026207, which is a counterpart of related U.S. Appl. No. 14/679,702.
Authorized Officer: Jens Huschelrath, "International Search Report" dated Aug. 31, 2016 in related International PCT Application PCT/IB2016/053480, which is a counterpart of related U.S. Appl. No. 14/737,489.
Officer: Lee W. Young, "Written Opinion of the International Searching Authority" dated Jun. 30, 2016 in counterpart International PCT Application No. PCT/US16/25012.
Authorized Officer: Blaine R. Copenheaver, "Written Opinion of the International Searching Authority" dated Jul. 12, 2016 in related International PCT Application No. PCT/US2016/026207, which is a counterpart of related U.S. Appl. No. 14/679,702.
Authorized Officer: Jens Huschelrath, "Written Opinion of the International Searching Authority" dated Aug. 31, 2016 in related International PCT Application PCT/162016/053480, which is a counterpart of related U.S. Appl. No. 14/737,489.
"Related U.S. Appl. No. 14/679,702", filed Apr. 6, 2015.
"Related U.S. Appl. No. 14/737,489," filed Jun. 12, 2015.
Examiner: Rowina J. Cattungal, "Non Final Office Action" dated Dec. 7, 2017 issued in related U.S. Appl. No. 14/679,702.
Examiner Rowina J. Cattungal, "Non-Final Office Action", U.S. Appl. No. 14/679,702, dated Apr. 6, 2017, 22 pp.
Officer Lingfei Bai, "International Preliminary Report on Patentability", International Patent Application PCT/US2016/026207, dated Oct. 10, 2017, 8 pp.
Examiner Daniel T. Pihulic, "Non-Final Office Action", U.S. Appl. No. 14/737,489, dated Sep. 27, 2017, 6 pp.

* cited by examiner

ELEVATION ANGLE ESTIMATING DEVICE AND METHOD FOR USER TERMINAL PLACEMENT

FIELD

The present disclosure relates to user terminals of non-geostationary satellite communications systems. More particularly, the present disclosure relates to a device and method for estimating the elevation angle of one or more objects surrounding a user terminal to help the user properly position the user terminal so that it has an unobstructed view of the sky.

BACKGROUND

Satellite systems for bringing low-cost broadband internet service to any location on the earth are currently being developed. Such systems typically include gateway antennas that link the internet to a fleet of non-geostationary satellites, which in turn link to inexpensive user terminals positioned on the earth. The user terminals deliver internet connectivity to residences and businesses.

The inexpensive user terminal mentioned above, includes an antenna that requires an unobstructed view over a large section of the sky in all azimuthal directions (north, south, east, and west directions) in order to receive uninterrupted service from the satellites. Trees, buildings, and mountains must remain below a certain elevation angle (the angle above the horizon i.e., the line at which the earth and sky appear to meet) in all the azimuthal directions. In some parts of the world, the maximum elevation angle can be as low as about 45 degrees. An example of such a user terminal is described in U.S. application Ser. No. 14/627,577, filed Feb. 20, 2015 and entitled "User Terminal Having A Linear Array Antenna With Electronic And Mechanical Actuation System."

Individual users with a minimum of expertise are likely to be mounting and installing the user terminal, therefore, it is essential that they be able to position the user terminals at their residences, business, and the like, in such a way that the user terminal has an unobstructed view of the sky.

To maintain low-cost internet service, the user should be capable of locating, mounting, installing, and positioning their user terminal without professional assistance. Because the user terminal must have an unobstructed view of the sky in all azimuthal directions, down to an elevation angle of about 45 degrees above the horizon in some applications, the ability of the user to locate and position their user terminal correctly is a significant challenge. Currently, users located and position their user terminal by visually estimating whether the terminal has an unobstructed view of the sky, which often leads to errors of up to 10 degrees and issues with dropout periods. Surveying equipment can be used to help locate and position the user terminals correctly, but such equipment is expensive and requires specialized skill to operate.

The problem with respect to providing an unobstructed view of the sky for the user terminal, is new in the area of telecommunications. Older wireless communication networks used lower radio frequencies that were unaffected by trees, buildings and similar obstructions. Newer communication systems operating at higher frequencies only require an antenna to have a clear view along one unchanging line-of-sight to a geostationary satellite. However, inexpensive user terminals, such as the one described in U.S. application Ser. No. 14/627,577 require an unobstructed view of the sky in all azimuthal directions in order to avoid unacceptably long dropout periods caused by blocked portions of the sky.

Accordingly, an inexpensive and easy-to-use device and method are needed for allowing a user to accurately estimate the elevation angle of one or more surrounding objects so that the user can locate and position a user terminal of a non-geostationary satellite communications system so that it has an unobstructed view of the sky in all azimuthal directions down to an elevation angle of about 45 degrees.

SUMMARY

Disclosed herein is a device for estimating the elevation angle of one or more objects surrounding a user terminal. The device, in various embodiments, may comprise a convex image-reflecting surface; a transparent sighting surface disposed above the convex image-reflecting surface; and an elevation limit marking formed on or in the sighting surface; wherein the elevation limit marking generates a reflected image in the convex image-reflecting surface that defines an elevation angle above a horizon of the earth that the one or more objects in a field of view of the convex image-reflecting surface must remain below so that the user terminal has an unobstructed view of the sky in all azimuthal directions.

In some embodiments, the elevation angle defined by the elevation limit marking may comprise a maximum elevation angle.

In some embodiments, the device may further comprise at least a second elevation limit marking formed on or in the sighting surface that generates a reflected image in the convex image-reflecting surface that defines at least a second elevation angle above the horizon of the earth that the one or more objects in the field of view of the convex image-reflecting surface must remain below so that the user terminal has the unobstructed view of the sky in all the azimuthal directions.

In some embodiments, the marking may comprise a circle.

In some embodiments, the elevation limit markings may be concentric.

In some embodiments, the device may further comprise a boresight marking formed on or in the sighting surface and axially aligned with a pole of the convex image-reflecting surface.

In some embodiments, the boresight marking may comprise a crosshair.

In some embodiment, a reflected image of the one or more objects in the field of view of the convex image-reflecting surface may be formed behind the convex image-reflecting surface.

In some embodiments, if the reflected image of the one or more objects is substantially outside the reflected image of the elevation limit marking, the one or more objects are estimated to be below the elevation angle.

In some embodiments, if a portion of the reflected image of the one or more objects is substantially inside the reflected image of the elevation limit marking, the one or more objects are estimated to be above the elevation angle.

In some embodiments, the convex image-reflecting surface may comprise a convex mirror.

In some embodiments, the sighting surface may comprise a transparent screen.

In some embodiments, the device may further comprise a tubular spacer extending between the sighting surface and the convex image-reflecting surface.

In some embodiments, the device may comprise a pre-assembled integral unit.

In some embodiments, the device may comprise an unassembled kit that a user assembles.

Further disclosed herein is a user terminal comprising an antenna and the above described device for estimating the elevation angle of one or more objects surrounding the user terminal.

Further disclosed herein is a method for estimating the elevation angle of one or more objects surrounding a user terminal. In various embodiments, the method may comprise placing a convex image-reflecting surface on or adjacent to the user terminal; viewing the convex image-reflecting surface through a transparent sighting surface having an elevation limit marking formed on or in the sighting surface, the elevation limit marking generating a reflected image in the convex image-reflecting surface that defines an elevation angle above a horizon of the earth that the one or more objects in a field of view of the convex image-reflecting surface must remain below so that a user terminal has an unobstructed view of the sky in all azimuthal directions; and observing whether a reflected image of the one or more objects is substantially outside, or a portion thereof is substantially inside, the reflected image of the elevation limit marking, wherein if the reflected image of the one or more objects is substantially outside the reflected image of the elevation limit marking, the one or more objects are estimated to be below the elevation angle, and if a portion of the reflected image of the one or more objects is substantially inside the reflected image of the elevation limit marking, the one or more objects are estimated to be above the elevation angle.

In some embodiments, prior to observing whether a reflected image of the one or more objects is substantially outside or a portion thereof is substantially inside the reflected image of the elevation limit marking, the method may further comprise: focusing on a boresight marking formed on or in the sighting surface; and axially aligning the boresight marking with a reflected image of the boresight marking formed within the convex image-reflecting surface.

In various other embodiments the method for estimating the elevation angle of one or more objects surrounding a user terminal, may comprise: generating a reflected image of an elevation angle limit marking in a convex image-reflecting surface placed on or adjacent to the user terminal, the elevation angle limit marking defining an elevation angle above a horizon of the earth that the one or more objects in a field of view of the convex image-reflecting surface must remain below so that a user terminal has an unobstructed view of the sky in all azimuthal directions; and generating a reflected image of the one or more objects in the convex image-reflecting surface, wherein if the reflected image of the one or more objects is substantially outside the reflected image of the elevation limit marking, the one or more objects are estimated to be below the elevation angle, and if a portion of the reflected image of the one or more objects is substantially inside the reflected image of the elevation limit marking, the one or more objects are estimated to be above the elevation angle.

In some embodiments, the generation of the reflected image of the elevation angle limit marking is performed with a transparent sighting surface having an elevation limit marking formed on or in the sighting surface.

DETAILED DESCRIPTION

Figure 1A:
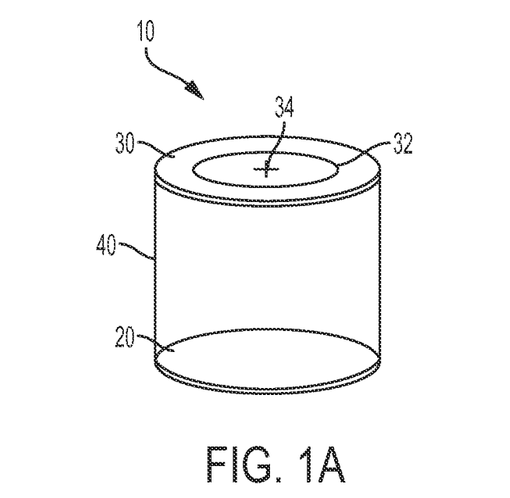
FIG. 1A is a perspective view of an embodiment of an elevation angle estimating device according to the present disclosure.
Figure 1B:
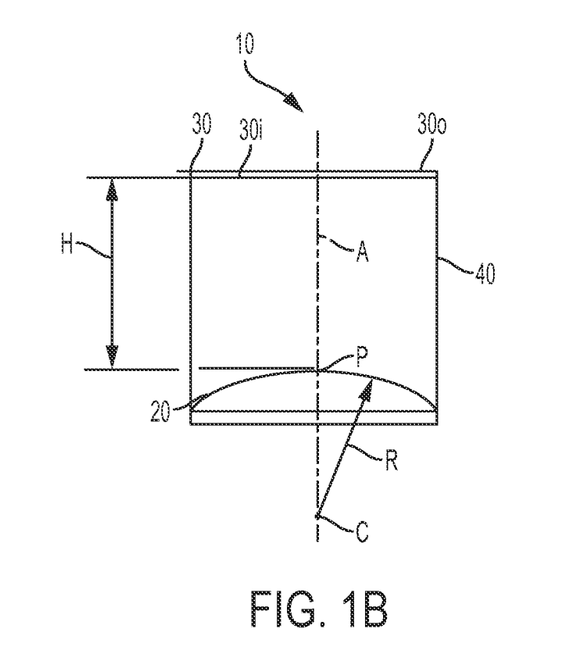
FIG. 1B is a side elevational view of the elevation angle estimating device illustrated in FIG. 1A.
Figure 1C:
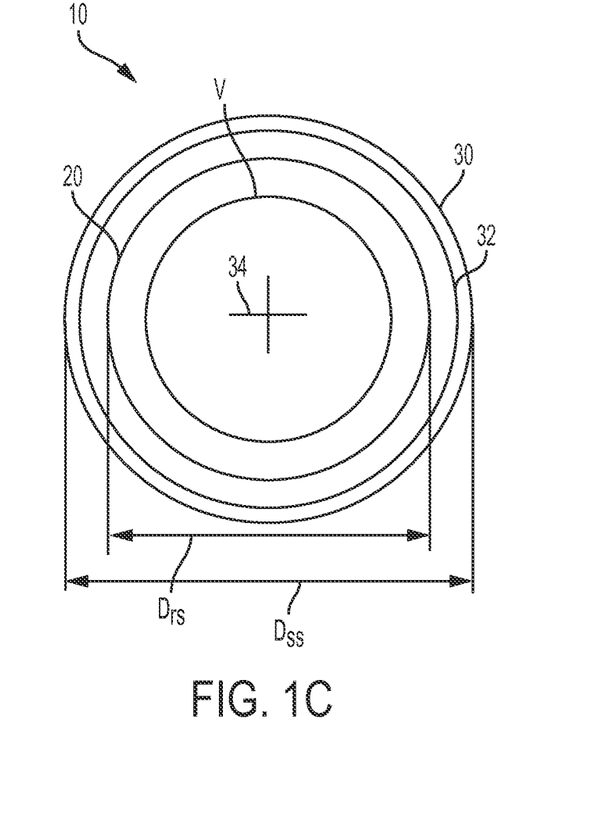
FIG. 1C is a top plan view of the elevation angle estimating device illustrated in FIG. 1A.

FIGS. 1A-1C collectively illustrate an embodiment of an elevation angle estimating device 10 for allowing a user to accurately estimate the elevation angle of one or more surrounding objects, according to the present disclosure. The device 10 comprises a convex image-reflecting surface 20, a planar transparent sighting surface 30 axially aligned with and disposed above the convex image-reflecting surface 20, and a tubular spacer 40 extending between the sighting surface 30 and the convex image-reflecting surface 20.

As illustrated in FIG. 1B, the convex image-reflecting surface 20 has a principal axis A that passes through a pole P (the geometric center of the convex image-reflecting surface 20) and a center of curvature C of the image-reflecting surface 20. In some embodiments, the convex image-reflecting surface 20 may comprise a mirror having a hemispherical (half a sphere) or a sub-hemispherical (less than half a sphere) shape. In other embodiments the convex image-reflecting surface 20 may comprise any other suitable device or apparatus having a hemispherical or a sub-hemispherical shape, which is capable of reflecting an image.

As illustrated in FIG. 1C, some embodiments of the sighting surface 30 may comprise a planar transparent screen. The sighting surface 30 may have a circular profile and a diameter Dss that is equal to or slightly greater than the diameter Drs of the convex image-reflecting surface 20, and a height H above the pole P of the convex image-reflecting surface 20.

Figure 2:
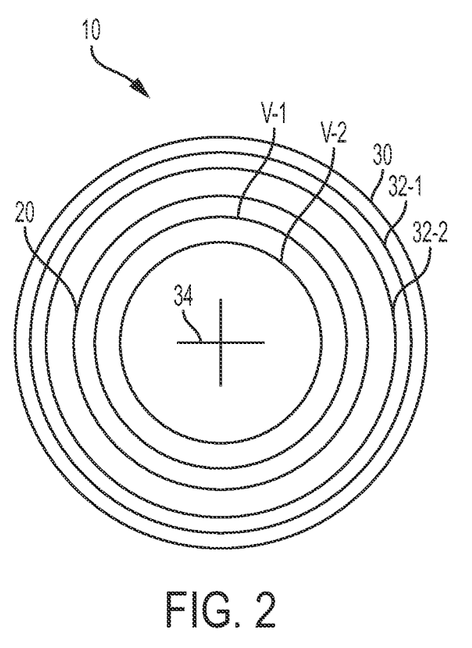
FIG. 2 is a top plan view of another embodiment of the elevation angle estimating device.

Referring still to FIG. 1C, the sighting surface 30 further comprises a circular marking (elevation limit circle) 32 of a pre-determined diameter. The diameter of the elevation limit circle 32, the diameter Drs of the convex image-reflecting surface, the diameter Dss of the sighting surface and the height of the sighting surface 30 above the pole P of the convex image-reflecting surface 20, are selected so that when the user views a reflected virtual image V of the elevation limit circle 32 in the convex image-reflecting surface 20, the reflected virtual image V of the elevation limit circle 32 in the convex image-reflecting surface 20 defines a maximum elevation angle above the horizon that objects surrounding the device 10 (and therefore, a user terminal), such as trees, buildings, mountains, and other structures in the field of view (FOV) of the convex image-reflecting surface 20, must remain below so that the user terminal has an unobstructed view of the sky in all azimuthal directions and, therefore, can receive uninterrupted service from the satellites. The elevation limit circle 32 can comprise, without limitation, a dark-colored circle printed on an outer surface 30o or inner surface 30i of the sighting surface 30 (FIG. 1B), a circular ridge, bead, or groove formed in or on the outer surface 30o or inner surface 30i of the sighting surface 30, and any combination thereof. In a preferred embodiment, the diameter of the elevation limit circle 32, the diameter Drs of the convex image-reflecting surface, the diameter Dss of the sighting surface and the height of the sighting surface 30 above the pole P of the convex image-reflecting surface 20, are selected to form a reflected virtual image V of the elevation limit circle 32 in the convex image-reflecting surface 20 that defines a maximum elevation angle of 45 degrees, +/−1.0 degree. In other embodiments, the diameter of the elevation limit circle 32, the diameter Drs of the convex image-reflecting surface, the diameter Dss of the sighting surface and the height of the sighting surface 30 above the pole P of the convex image-reflecting surface 20, may be selected to form a reflected image V of the elevation limit circle 32 in the convex image-reflecting surface 20 that defines any other desirable maximum elevation angle above or below 45 degrees. As illustrated in FIG. 2, some embodiments of the sighting surface 30 can comprise two or more concentric circular markings or elevation limit circles 32-1 and 32-2 of differing diameters, having reflected images V-1 and V2, respectively, in the convex image-reflecting surface 20 corresponding to a different maximum elevation angles above the horizon that objects surrounding the device 10 must remain below.

Referring again to FIG. 1C, some embodiments of the sighting surface may further comprise a second marking 34 (boresight mark), which is positioned in the center of the elevation limit circle 32. The boresight mark should axially align with the pole P (FIG. 1B) of the convex image-reflecting surface 20 and lie on the principal axis A of the convex image-reflecting surface 20. The second marking 34 may comprise a dark-colored crosshair or other suitable marking printed, embedded or otherwise formed on the outer surface 30o or inner surface 30i of the sighting surface 30.

Figure 3:
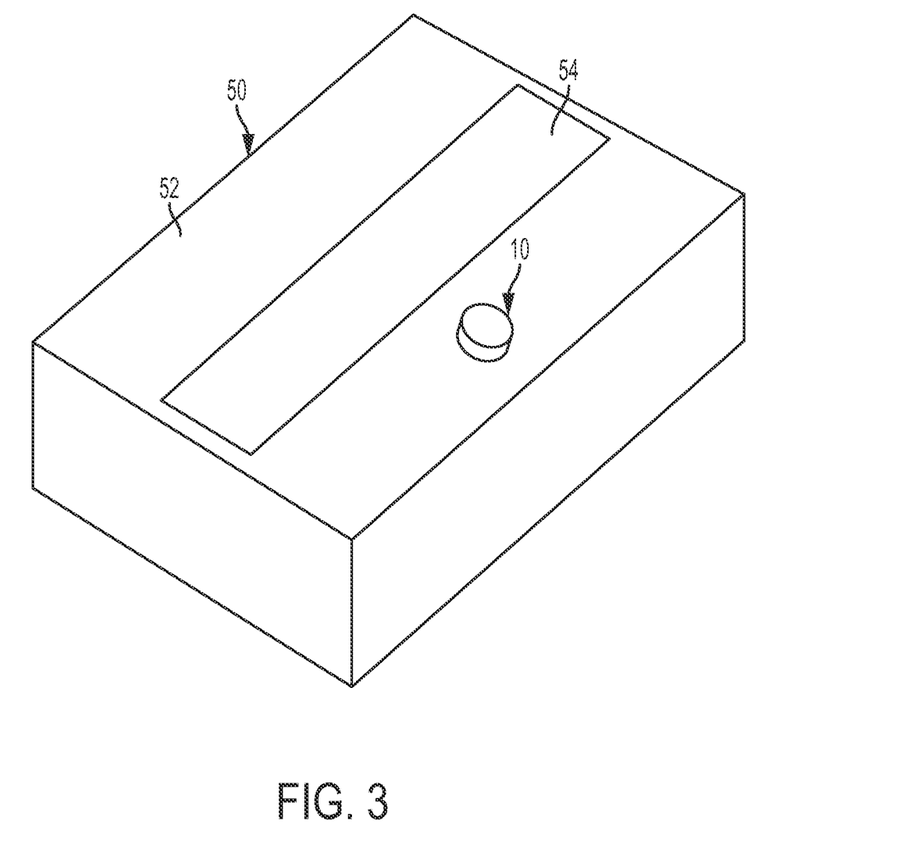
FIG. 3 is a perspective view of a user terminal which includes the elevation angle estimating device.

The convex image-reflecting surface 20, the transparent sighting surface 30 and the tubular spacer 40 of the device 10 can each be made of plastic or any other suitable material, and manufactured with relative low dimensional tolerances. In some embodiments, the convex image-reflecting surface 20, the transparent sighting surface 30 and the tubular spacer 40 of the device 10 can be manufactured and sold as pre-assembled integral unit. In other embodiments, the device 10 can be manufactured and sold as a kit where one or more of the convex image-reflecting surface 20, the transparent sighting surface 30 and the tubular spacer 40 of the device 10 are assembled together by the user. In still other embodiments, the device 10 can be a part of the user terminal. An example of such a user terminal is described in U.S. application Ser. No. 14/627,577, filed Feb. 20, 2015 and entitled "User Terminal Having A Linear Array Antenna With Electronic And Mechanical Actuation System." The entire disclosure of U.S. application Ser. No. 14/627,577 is incorporated herein by reference. As illustrated in FIG. 3, the device 10 in such embodiments may be integrated into or attached to a housing 52 of the user terminal 50 adjacent to the antenna 54 thereof.

Figure 4A:
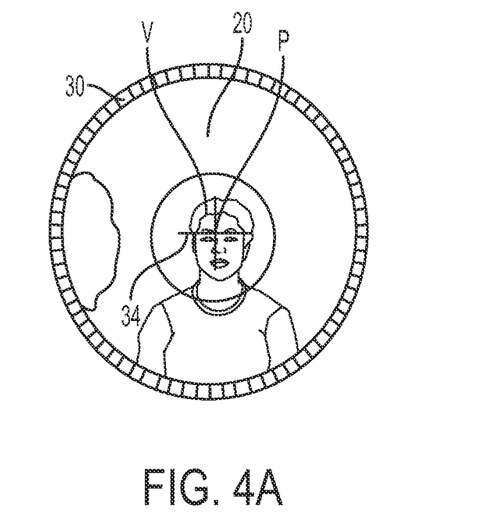
FIG. 4A is a top plan view of the elevation angle estimating device that illustrates a user observation height of about 0.76 meters.
Figure 4B:
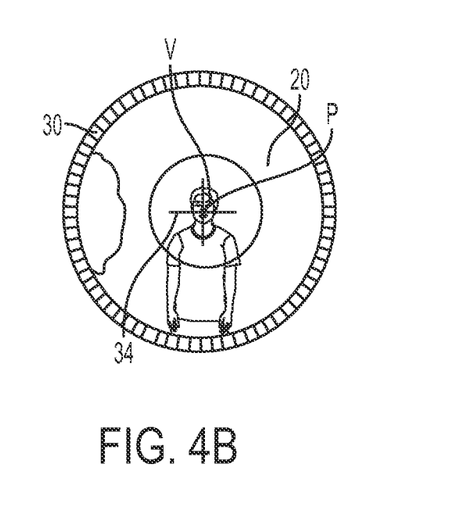
FIG. 4B is a top plan view of the elevation angle estimating device that illustrates a user observation height of about 1.5 meters.

The convex image-reflecting surface 20 must be large enough to see from above at any user observer distance between about 0.25 to about 1.5 meters, where the user observer distance is measured between the eyes of the user U and the sighting surface 30 of the device 10. FIG. 4A illustrates the device 10 at a user observation height of about 0.76 meters and FIG. 4B illustrates the device 10 at a user observation height of about 1.5 meters.

In one illustrative embodiment where the reflected image V of the elevation circle 32 in the convex image-reflecting surface 20 defines a maximum elevation angle of 45 degrees+/−1.0 degree, the convex image-reflecting surface 20 may have a diameter Drs (FIG. 1C) of about 50 mm and a radius of curvature R of about 40 mm (FIG. 1B). Further, the sighting surface may have a diameter Dss (FIG. 1C) or width of about 60 mm, a height H (FIG. 1B) above the pole P of the convex image-reflecting surface 20 of about 10 mm, and the elevation limit circle 32 may have a diameter of about 58 mm. Other embodiments of the device 10 may have one or more dimensions that differ from the dimensions listed above.

Figure 5:
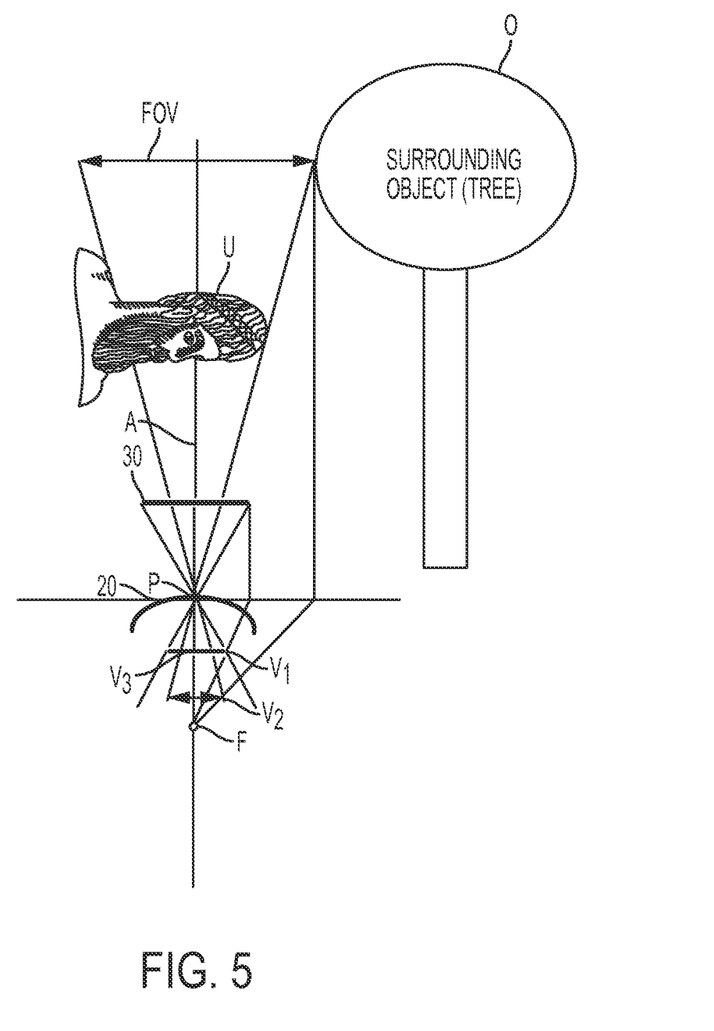
FIG. 5 depicts the user and operation of the elevation angle estimating device.
Figure 6A:
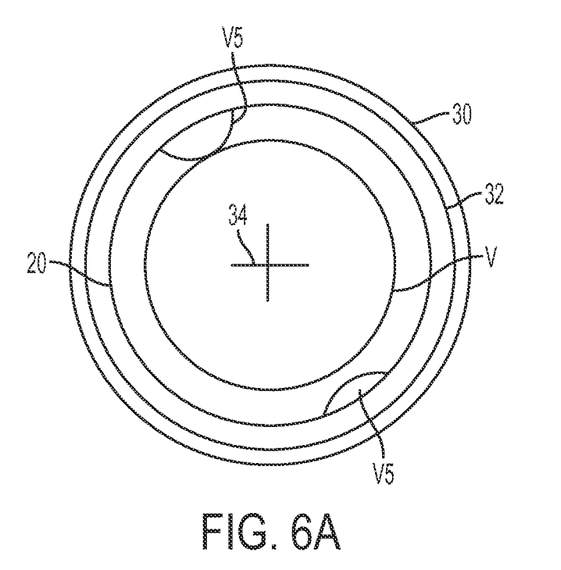
FIG. 6A is a top plan view of the elevation angle estimating device that illustrates a virtual image of objects surrounding a user terminal, which appear substantially outside of the reflected virtual image of the elevation limit circle, thereby indicating that the objects in the field of view of the convex image-reflecting surface (and therefore the user terminal), are estimated to be below a desired maximum elevation angle. Consequently, the user terminal has an unobstructed view of the sky in all azimuthal directions.
Figure 6B:
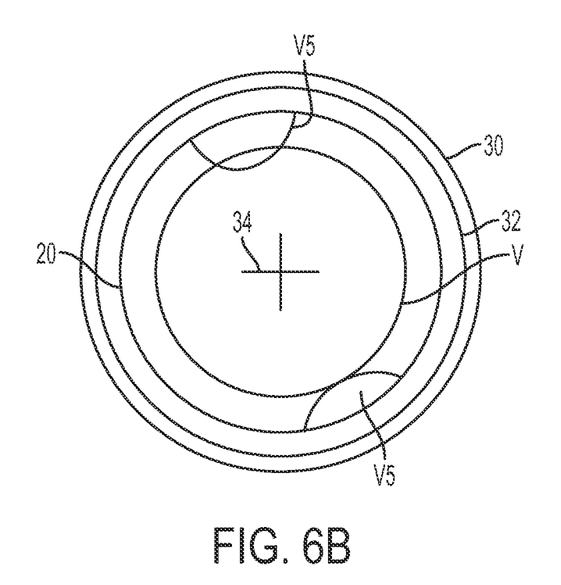
FIG. 6B is a top plan view of the elevation angle estimating device that illustrates a virtual image of objects surrounding a user terminal, where one or more of the objects appear inside the reflected virtual image of the elevation limit circle, thereby indicating that the objects in the field of view of the convex image-reflecting surface (and therefore the user terminal), are estimated to be above a desired maximum elevation angle. Consequently, the user terminal has an obstructed view of the sky in at least one azimuthal direction.

The use and operation of the elevation angle estimating device 10 will now be described with reference to FIG. 5. Prior to using the device 10, however, the user should locate and position the user terminal (not shown) so that the antenna is level (relative to the ground). Any conventional level indicating instrument, such as a bubble level, can be used to determine whether the antenna is level. Such an instrument can be separate from or integrated into the housing of the user terminal. If the elevation angle estimating device 10 is integrated into the user terminal 50 as illustrated in FIG. 3, the device 10 should be level when the antenna 54 is level. If the device 10 is separate from the user terminal, the device 10 should be placed on the user terminal and leveled along with the antenna of the user terminal. As illustrated in FIG. 5, the user U then looks down at the sighting surface 30 of the device 10 and focuses his or her eyes on the principal axis A of the convex image-reflecting surface 20. When the object(s) O in the FOV of the convex-image reflecting surface 20 are at infinity or between the pole P of the image-reflecting surface 20 and infinity, the reflected image(s) of the object(s) in the convex image-reflecting surface 20 will be considered virtual (e.g., sighting surface reflected virtual image V1, FOV reflected virtual image V2) because they are formed behind the image-reflecting surface 20 between the pole P thereof and the principal focus F (the point on the principal axis A where the light rays traveling parallel to the principal axis A after reflection appear to meet) of the convex image-reflecting surface 20. The user U must align their eyes with the pole P of the convex image-reflecting surface 20. The boresight mark 34 of the sighting surface 30 facilitates this by allowing the user U to move their head until they see the virtual image V3 of the boresight mark 34 and the boresight mark 34 itself co-align similar to aiming a gun, as illustrated in FIGS. 4A and 4B. As illustrated in FIGS. 6A and 6B, the user U can estimate the elevation angle of the object(s) O by observing where their reflected virtual image(s) V5 is located in relation to the reflected virtual image V of the elevation limit circle 32 in the convex image-reflecting surface 20.

Referring again to FIG. 6A, the proper location and position of the user terminal is confirmed if the entire reflected virtual image V5 of each object appears substantially outside of the reflected virtual image V of the elevation limit circle 32, thereby indicating that the objects in the FOV of the convex image-reflecting surface 20 (and therefore the user terminal), are estimated to be below a desired maximum elevation angle. Consequently, the user terminal has an unobstructed view of the sky in all azimuthal directions. If a portion of or the reflected virtual image V5 of one or more of the objects appears to be substantially inside the reflected virtual image V of the elevation limit circle 32 in the convex image-reflecting surface 20 as illustrated in FIG. 6B, this indicates that these objects are estimated to be above the desired maximum elevation angle. Consequently, the user terminal has an obstructed view of the sky in at least one azimuthal direction. Accordingly, the user terminal should be repositioned, or relocated and positioned so that the entire reflected virtual image V5 of each of the objects appears substantially outside of the reflected virtual image V of the elevation limit circle 32 in the convex image-reflecting surface 20.

The elevation angle estimating device 10 of the present disclosure allows the user to estimate the elevation angle of surrounding objects to an accuracy of about 1 to 2 degrees, assuming the user terminal is level. Accordingly, the device 10 allows the user to estimate the elevation angle of surrounding objects with about 10 times the accuracy of prior art estimation methods where the user directly estimates the elevation angles of objects using only their eyes. The reason for this high level of accuracy is that the objects are much farther away from the convex image-reflecting surface 20 than the sighting surface 30. Thus, the physical size of their reflected virtual image(s) is/are dependent only on the elevation angle of the object(s), and not on the distance to the object(s).

In addition, the accuracy is not affected by the height of the user's head relative to the sighting surface 30, as long as the user aligns their eyes with the pole P of the convex image-reflecting surface via the boresight mark 34 of the sighting surface 30, as illustrated in FIGS. 4A and 4B.

Figure 7:
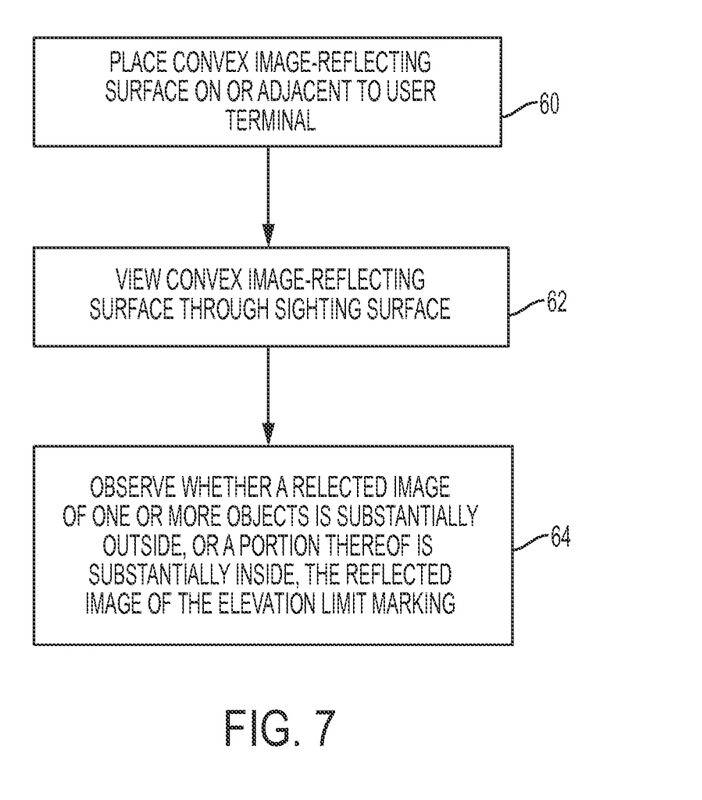
FIG. 7 is a flowchart illustrating an embodiment of a method for estimating the elevation angle of one or more objects surrounding a user terminal with the device of the present disclosure.

FIG. 7 is a flowchart illustrating an embodiment of a method for estimating the elevation angle of one or more objects surrounding a user terminal with the device 10 of the present disclosure. In block 60, the convex image-reflecting surface is placed on or adjacent to the user terminal. In block 62, the convex image-reflecting surface is viewed through the transparent sighting surface having the elevation limit marking formed on or in the sighting surface. In block 64, the user observes whether a reflected image of the one or more objects is substantially outside, or a portion thereof is substantially inside, the reflected image of the elevation limit marking. If the reflected image of the one or more objects is substantially outside the reflected image of the elevation limit marking, the one or more objects are estimated to be below the elevation angle, and if a portion of the reflected image of the one or more objects is substantially inside the reflected image of the elevation limit marking, the one or more objects are estimated to be above the elevation angle. In some embodiments, the user may focus on a boresight marking formed on or in the sighting surface and axially align the boresight marking with a pole of the convex image-reflecting surface prior to performing block 64.

Figure 8:
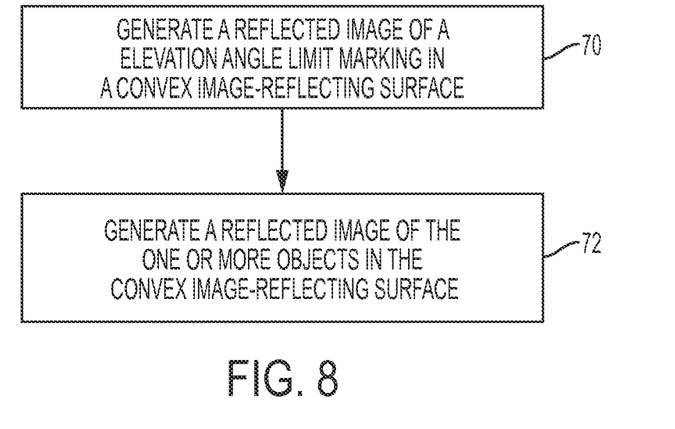
FIG. 8 is a flowchart illustrating another embodiment of the method for estimating the elevation angle of one or more objects surrounding a user terminal with the device of the present disclosure.

FIG. 8 is a flowchart illustrating another embodiment of the method for estimating the elevation angle of one or more objects surrounding a user terminal with the device 10 of the present disclosure. In block 70, a reflected image of an elevation angle limit marking is generated in the convex image-reflecting surface which has been placed on or adjacent to the user terminal. In block 72, a reflected image of the one or more objects is generated in the convex image-reflecting surface. If the reflected image of the one or more objects is substantially outside the reflected image of the elevation limit marking, the one or more objects are estimated to be below the elevation angle, and if a portion of the reflected image of the one or more objects is substantially inside the reflected image of the elevation limit marking, the one or more objects are estimated to be above the elevation angle. In some embodiments, block 70 is performed with a transparent sighting surface having an elevation limit marking formed on or in the sighting surface.

Although the elevation angle estimating device and method have been described in terms of illustrative embodiments, they are not limited thereto. Rather, the appended claims should be construed broadly to include other variants and embodiments of same, which may be made by those skilled in the art without departing from the scope and range of equivalents of the device and method.

What is claimed is:

1. A device for estimating an elevation angle of one or more objects surrounding a user terminal, the device comprising:
   a convex image-reflecting surface;
   a transparent sighting surface disposed above the convex image-reflecting surface; and
   an elevation limit marking formed on or in the transparent sighting surface;
   wherein the elevation limit marking generates a reflected image in the convex image-reflecting surface that defines the elevation angle above a horizon of the earth that the one or more objects in a field of view of the convex image-reflecting surface must remain below so that the user terminal has an unobstructed view of the sky in all azimuthal directions.

2. The device of claim 1, wherein the elevation angle defined by the elevation limit marking comprises a maximum elevation angle.

3. The device of claim 1, further comprising at least a second elevation limit marking formed on or in the transparent sighting surface that generates a reflected image in the convex image-reflecting surface that defines at least a second elevation angle above the horizon of the earth that the one or more objects in the field of view of the convex image-reflecting surface must remain below so that the user terminal has the unobstructed view of the sky in all the azimuthal directions.

4. The device of claim 1, wherein the elevation limit marking comprises a circle.

5. The device of claim 1, wherein the elevation limit marking is comprises concentric circles.

6. The device of claim 1, further comprising a boresight marking formed on or in the transparent sighting surface and axially aligned with a pole of the convex image-reflecting surface.

7. The device claim 6, wherein the boresight marking comprises a crosshair.

8. The device of claim 1, wherein a reflected image of the one or more objects in the field of view of the convex image-reflecting surface is formed behind the convex image-reflecting surface.

9. The device of claim 8, wherein if the reflected image of the one or more objects is substantially outside the reflected image of the elevation limit marking, the one or more objects are estimated to be below the elevation angle.

10. The device of claim 8, wherein if a portion of the reflected image of the one or more objects is substantially inside the reflected image of the elevation limit marking, the one or more objects are estimated to be above the elevation angle.

11. The device of claim 1, wherein the convex image-reflecting surface comprises a convex mirror.

12. The device of claim 1, wherein the transparent sighting surface comprises a transparent screen.

13. The device of claim 1, further comprising a tubular spacer extending between the transparent sighting surface and the convex image-reflecting surface.

14. The device of claim 1, wherein the device comprises a pre-assembled integral unit.

15. The device of claim 1, wherein the device comprises an unassembled kit that a user assembles.

16. A user terminal comprising a housing, an antenna disposed within the housing, and the device of claim 1 disposed on or embedded in an outer surface of the housing.

17. A method for estimating an elevation angle of one or more objects surrounding a user terminal, the method comprising:
    placing a convex image-reflecting surface on or adjacent to the user terminal;
    viewing the convex image-reflecting surface through a transparent sighting surface having an elevation limit marking formed on or in the transparent sighting surface, the elevation limit marking generating a reflected image in the convex image-reflecting surface that defines the elevation angle above a horizon of the earth that the one or more objects in a field of view of the convex image-reflecting surface must remain below so that a user terminal has an unobstructed view of the sky in all azimuthal directions; and
    observing whether a reflected image of the one or more objects is substantially outside, or a portion thereof is substantially inside, the reflected image of the elevation limit marking, wherein if the reflected image of the one or more objects is substantially outside the reflected image of the elevation limit marking, the one or more objects are estimated to be below the elevation angle, and if a portion of the reflected image of the one or more objects is substantially inside the reflected image of the elevation limit marking, the one or more objects are estimated to be above the elevation angle.

18. The method of claim 17, wherein prior to observing whether a reflected image of the one or more objects is substantially outside or a portion thereof is substantially inside the reflected image of the elevation limit marking, further comprising:
    focusing on a boresight marking formed on or in the transparent sighting surface; and
    axially aligning the boresight marking with a reflected image of the boresight marking formed within the convex image-reflecting surface.

19. A method for estimating an elevation angle of one or more objects surrounding a user terminal, the method comprising:
    generating a reflected image of an elevation angle limit marking in a convex image-reflecting surface placed on or adjacent to the user terminal, the elevation angle limit marking defining the elevation angle above a horizon of the earth that the one or more objects in a field of view of the convex image-reflecting surface must remain below so that a user terminal has an unobstructed view of the sky in all azimuthal directions; and
    generating a reflected image of the one or more objects in the convex image-reflecting surface, wherein if the reflected image of the one or more objects is substantially outside the reflected image of the elevation limit marking, the one or more objects are estimated to be below the elevation angle, and if a portion of the reflected image of the one or more objects is substantially inside the reflected image of the elevation limit marking, the one or more objects are estimated to be above the elevation angle.

20. The method of claim 19, wherein the generating of the reflected image of the elevation angle limit marking is performed with a transparent sighting surface having an elevation limit marking formed on or in the transparent sighting surface.

* * * * *